United States Patent
Basehore et al.

(10) Patent No.: US 12,386,749 B2
(45) Date of Patent: Aug. 12, 2025

(54) CONTROLLING MEMORY FREQUENCY BASED ON TRANSACTION QUEUE OCCUPANCY

(71) Applicant: Google LLC, Mountain View, CA (US)

(72) Inventors: Derek James Basehore, Mountain View, CA (US); Sonny Rao, San Francisco, CA (US)

(73) Assignee: Google LLC, Mountain View, CA (US)

( * ) Notice: Subject to any disclaimer, the term of this patent is extended or adjusted under 35 U.S.C. 154(b) by 14 days.

(21) Appl. No.: 18/253,174

(22) PCT Filed: Nov. 18, 2020

(86) PCT No.: PCT/US2020/061057
§ 371 (c)(1),
(2) Date: May 16, 2023

(87) PCT Pub. No.: WO2022/108582
PCT Pub. Date: May 27, 2022

(65) Prior Publication Data
US 2023/0418748 A1    Dec. 28, 2023

(51) Int. Cl.
| | | |
|---|---|---|
| G06F 12/08 | (2016.01) | |
| G06F 1/3225 | (2019.01) | |
| G06F 1/324 | (2019.01) | |
| G06F 12/0811 | (2016.01) | |

(52) U.S. Cl.
CPC ........ *G06F 12/0811* (2013.01); *G06F 1/3225* (2013.01); *G06F 1/324* (2013.01)

(58) Field of Classification Search
CPC .... G06F 12/0811; G06F 1/3225; G06F 1/324; G06F 13/1642; G06F 11/3037; G06F 11/3457; G06F 1/3275; Y02D 10/00
See application file for complete search history.

(56) References Cited

U.S. PATENT DOCUMENTS

| | | | |
|---|---|---|---|
| 7,343,508 B2 | 3/2008 | Khodorkovsky | |
| 7,418,561 B2 | 8/2008 | Kahn et al. | |
| 10,175,905 B2 | 1/2019 | Jeter et al. | |
| 2008/0228959 A1* | 9/2008 | Wang | G06F 1/206 710/22 |

(Continued)

FOREIGN PATENT DOCUMENTS

| | | |
|---|---|---|
| CN | 109558071 A | 4/2019 |
| CN | 110321305 A | 10/2019 |
| WO | 2022108582 | 5/2022 |

OTHER PUBLICATIONS

"International Search Report and Written Opinion", Application No. PCT/US2020/061057, Sep. 23, 2021, 17 pages.

(Continued)

*Primary Examiner* — Tasnima Matin
(74) *Attorney, Agent, or Firm* — Colby Nipper PLLC (57) ABSTRACT

Techniques and apparatuses are described that use transaction queue lengths to alter a clock frequency that controls access to a memory of an electronic device. Techniques include detecting that a transaction queue threshold has been violated, initiating a counter to measure a time duration, determining that the transaction queue threshold continues to be violated for the time duration and, in response, altering the clock frequency that controls access to the memory of the electronic device.

19 Claims, 7 Drawing Sheets

(56) References Cited

U.S. PATENT DOCUMENTS

| | | | | |
|---|---|---|---|---|
| 2012/0033720 | A1* | 2/2012 | Brunel | H04B 15/04 |
| | | | | 375/225 |
| 2013/0201857 | A1* | 8/2013 | Bhargava | H04W 72/02 |
| | | | | 370/252 |
| 2014/0237274 | A1* | 8/2014 | Murakami | G06F 1/3243 |
| | | | | 713/320 |
| 2014/0344597 | A1* | 11/2014 | Thumma | G06F 1/3275 |
| | | | | 713/322 |
| 2016/0164698 | A1* | 6/2016 | Hofmann | H04L 43/16 |
| | | | | 370/253 |
| 2017/0017815 | A1* | 1/2017 | Caso | G06F 21/35 |
| 2017/0223712 | A1* | 8/2017 | Stephens | H04W 4/90 |
| 2018/0074743 | A1* | 3/2018 | Jeter | G06F 3/0634 |
| 2018/0267595 | A1* | 9/2018 | Nampoothiri | G06F 1/3225 |
| 2019/0094938 | A1* | 3/2019 | Tidwell | G06F 1/324 |
| 2019/0102083 | A1 | 4/2019 | Dusija et al. | |
| 2020/0387312 | A1* | 12/2020 | Yang | G06F 13/4291 |

OTHER PUBLICATIONS

"Invitation to Pay Additional Fees and Partial Search Report", Application No. PCT/US2020/061057, Jul. 28, 2021, 5 pages.

"International Preliminary Report on Patentability", Application No. PCT/US2020/061057, May 16, 2023, 13 pages.

"Foreign Office Action", CN Application No. 202080107191.5, Oct. 23, 2024, 20 pages.

\* cited by examiner

CONTROLLING MEMORY FREQUENCY BASED ON TRANSACTION QUEUE OCCUPANCY

RELATED APPLICATION(S)

This application is a national stage entry of International Application No. PCT/US2020/061057, filed Nov. 18, 2020, the disclosure of which is incorporated herein by reference in its entirety.

BACKGROUND

Electronic devices play integral roles in manufacturing, communication, healthcare, commerce, social interaction, and entertainment. For example, electronic devices power the server farms that provide cloud-based, distributed computing functionality for commerce and communication. Devices with computing power are also embedded in many different types of modern equipment, from medical devices to appliances and from vehicles to industrial tools. Additionally, one electronic device, the smartphone, has practically become a necessity for consumers to always have at hand. With electronic devices becoming increasingly pervasive, the power consumed by electronic devices has increasingly become an issue.

One factor to consider for power consumption by electronic devices is the power consumed by the integrated circuit (IC) devices of an electronic device. In general, power consumption by IC devices increases with an increase in a clock frequency that controls the IC devices. In some instances, a relatively high clock frequency may be desirable for one or more IC devices to achieve an elevated performance level. However, if the clock frequency remains high when the elevated performance level is not needed, power may be wasted. Consequently, controlling a clock frequency while balancing power efficiency with performance can therefore be challenging.

This background description is provided to generally present the context of the disclosure. Unless otherwise indicated herein, material described in this section is neither expressly nor impliedly admitted to be prior art to the present disclosure or the appended claims.

SUMMARY

Techniques and apparatuses are described that use transaction queue occupancy to alter a clock frequency that controls access to a memory of an electronic device. Techniques include detecting that a transaction queue threshold has been violated, initiating a counter to measure a time duration, determining that the transaction queue threshold continues to be violated for the time duration, and altering the clock frequency controlling access to the memory in response to the extended violation.

In some aspects, a method performed by a memory controller is described. The method includes detecting that a transaction queue threshold, corresponding to an occupied portion of a length of a transaction queue of a memory, is violated. In response to detecting the violation, the method initiates a counter based on a clock frequency that controls a rate of accessing the memory to measure a time duration. The method also includes determining that the transaction queue threshold continues to be violated for the time duration and, in response, altering the clock frequency.

In some other aspects, a method performed by a memory controller is described. The method includes computing, for a second clock frequency that is lower than a first clock frequency presently controlling a rate of accessing a memory, a quantity of clock cycles consumed to perform a transaction with the memory. The computed quantity of clock cycles consumed to perform the transaction with the memory may, in some instances, correspond to a simulated occupied portion of a length of a transaction queue for accessing the memory. The method also includes determining, based on the computed quantity of clock cycles, that the simulated, occupied portion of the length of the transaction queue will fall below transaction queue threshold for a time duration and, in response, decreasing the rate of accessing the memory to the second clock frequency.

In some other aspects, another method performed by an electronic device is described. The method includes determining, by a first memory controller of a first memory of the electronic device, that a transaction queue threshold is violated for a time duration. The transaction queue threshold corresponds to an occupied portion of a length of a transaction queue for accessing a second memory. In response, the first memory controller transmits to a second memory controller of the second memory of the electronic device a message. The message includes an instruction that causes the second memory controller to alter a clock frequency to change a rate of accessing the second memory.

The details of one or more implementations are set forth in the accompanying drawings and the following description. Other features and advantages will be apparent from the description, the drawings, and the claims. This summary is provided to introduce subject matter that is further described in the Detailed Description. Accordingly, a reader should not consider the summary to describe essential features nor threshold the scope of the claimed subject matter.

BRIEF DESCRIPTION OF THE DRAWINGS

Apparatuses and techniques enabling alteration of a clock frequency controlling access to a memory based on transaction queue occupancy are described with reference to the following drawings. The same numbers are used throughout the drawings to reference like features and components.

DETAILED DESCRIPTION

Overview

Techniques and apparatuses are described that use transaction queue occupancy to alter a clock frequency that controls access to a memory of an electronic device. Techniques include detecting that a transaction queue threshold has been violated, initiating a counter to measure a time duration, determining that the transaction queue threshold continues to be violated for the time duration, and altering the clock frequency that controls access to the memory of the electronic device in response to the extended violation.

Manufacturers often consider anticipated levels of power consumption when designing electronic devices. Motivations for lowering power consumption include reducing cost-of-use and minimizing environmental impact. Furthermore, electronic devices that are portable are powered by batteries, which have a limited ability to provide energy before needing to be recharged. Thus, a portable electronic device can be used for longer periods before needing to be recharged by reducing power consumption. A lower rate of power consumption can also enable the use of a smaller battery to decrease the size of a portable electronic device.

A major power consumer of an electronic device is often the integrated circuit (IC) devices. In general, power consumption by IC devices can escalate with an increase in a clock frequency controlling the IC devices (e.g., a clock frequency that is typically measured in megahertz (MHz) or gigahertz (GHz)). A relatively high clock frequency may be desirable for the IC devices to achieve elevated performance levels. However, if the clock frequency of the IC devices remains high when the elevated performance level is not needed, power may be wasted.

A memory controller may be used to control a clock frequency and a rate of memory transactions, or accesses, between a processor IC device and a memory IC device. Heuristics within the memory controller often rely upon counting approaches that tally a total number of accesses, such as writes to the memory IC device or reads from the memory IC device. If the total number of accesses violates a predefined upper-threshold, the memory controller may increase a clock frequency of the memory IC device. If the total number of memory accesses violates a predefined lower-threshold, the memory controller may decrease the clock frequency of the memory IC device.

Heuristics that rely upon such counting approaches, however, are often flawed. As an example, in some instances accesses to the memory by the processor may be clustered within a relatively small time-window. This presents a conflict wherein the heuristics indicate that the predefined upper-threshold is not violated but where, in actuality, an increase in the clock frequency of the memory IC device is advisable to maintain performance. To compensate for this flaw, heuristics using counting approaches may artificially lower the predefined upper-threshold so that the memory controller triggers the increase in the clock frequency sooner.

With such a compensation approach, however, a new flaw may be introduced. For example, in other instances where accesses to the memory by the processor may be evenly distributed across a relatively large time-window, the artificially-lowered upper-threshold may cause the memory controller to trigger an increase to the clock frequency that is, in actuality, unneeded. In these other example instances the unneeded clock frequency may waste power.

The drawbacks of heuristics that use counting approaches to control clock frequencies of memory IC devices in an electronic device compound themselves as a complexity of a memory architecture of the electronic device increases. For example, the electronic device may use a memory architecture that relies upon a main memory IC device and multiple levels of cache memory IC devices, each of which may include a respective memory controller to control respective clock frequencies. These drawbacks may be overcome, however, by employing heuristics that use factors including transaction queue occupancy to determine thresholds for increasing and/or decreasing frequency as described herein.

Example implementations in various levels of detail are discussed below with reference to the associated figures. The example implementations include (i) a method that alters clock frequency based on a transaction queue threshold being violated for a time duration, (ii) another method that decreases a clock frequency based on a simulated, occupied portion of a length of a transaction queue falling below a transaction queue threshold for a time duration, and (iii) another method that includes a first memory controller determining that a transaction queue threshold is violated for a time duration and transmitting a message to a second memory controller that directs the second memory controller to change a rate of accessing the second memory. The discussion below first describes an example operating environment, followed by example heuristic details, followed by example methods, and ends with related example aspects.

Example Environment

Figure 1:
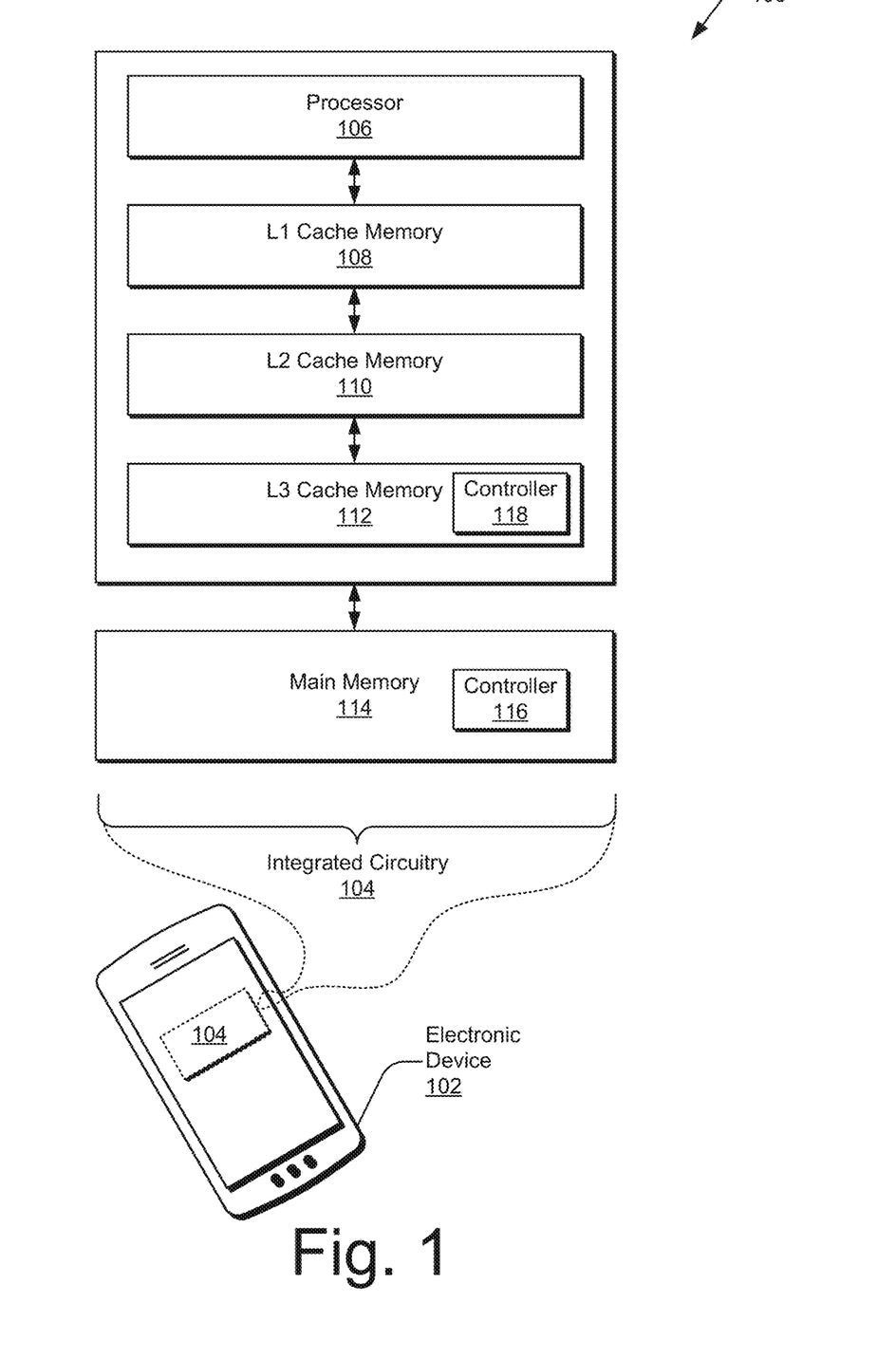
FIG. 1 illustrates an example environment including integrated circuitry in which altering a clock frequency controlling access to a memory based on transaction queue occupancy can be implemented.

FIG. 1 illustrates an example environment 100 including integrated circuitry in which altering a clock frequency controlling access to a memory based on transaction queue occupancy can be implemented. As shown, the environment 100 includes an electronic device 102. Although illustrated as a smartphone, the electronic device 102 can be a computer, a tablet, a laptop, a server, a wearable device, an Internet of Things (IoT) device, an entertainment device, a security device, and so on.

The electronic device 102 includes integrated circuitry 104. The integrated circuitry 104 includes multiple different portions or cores. These include at least one processor 106, a first level of a cache memory (e.g., L1 cache memory 108), a second level of a cache memory (e.g., L2 cache memory 110), a third level of a cache memory (e.g., L3 cache memory 112), and a main memory 114. In general, the different memories (e.g., the L1 cache memory 108, the L2 cache memory 110, the L3 cache memory 112, and the main memory 114) can operate in one or more memory states using different respective clock frequencies.

The different memories may be of different types and/or combinations. For example, the L1 cache memory 108, the L2 cache memory 110, and the L3 cache memory 112 may each be a type of memory corresponding to a static random-access memory (SRAM) that is "on-chip" (e.g., shares a same IC die with the processor 106). The main memory 114 may, in contrast, be a type of memory corresponding to a dynamic random-access memory (DRAM) that is "off-chip" (e.g., on a different IC die than the processor 106). Alternatively, the different memories may all share a same IC die with the processor 106 (e.g., share a system-on-chip (SoC) IC die with the processor 106), be of one or more other types of memory (e.g., Flash memory), and so on.

In an example implementation, one or more of the different memories may include a controller. For instance, the main memory 114 may include a main memory controller 116, and the L3 cache memory 112 may include an L3 cache memory controller 118. In some instances, the main memory controller 116 and the L3 cache memory controller 118 may each include logic circuitry that alters a flow of data going to and from the respective memories For example, the logic circuitry may control clock frequencies that control accessing of the respective memories. Furthermore, the main memory controller 116 may be communicatively coupled to the L3 cache memory controller 118.

In some instances, the processor 106 may attempt to access data with the different memories (e.g., read data from or write data to the memories to perform a transaction) in a hierarchal fashion. For instance, while executing a program or a set of instructions, the processor 106 may attempt to access target data (corresponding to an allocated physical address or location in the main memory 114) with the L1 cache memory 108 first. If the data associated with the specific physical address or location is not accommodated by the L1 cache memory 108 (e.g., there is a miss in the first cache), the system can make a second attempt to access the target data, but with the L2 cache memory 110. If the data associated with the allocated physical address or location is not accommodated by the L2 cache memory 110, (e.g., a miss in the second cache), the system can make a third attempt to access the target data, but with the L3 cache memory 112. If the data associated with the allocated physical address or location is not accommodated by the L3 cache memory 112 (e.g., a miss in the third cache), the system may then access the target data from the main memory 114 (e.g., access the target data using the allocated physical address or location in the main memory 114).

Data transactions between the processor 106 and the L1 cache memory 108, the L2 cache memory 110, the L3 cache memory 112, and the main memory 114 may occur at a rate controlled by a clock frequency (e.g., a clock frequency in MHz or GHz). The clock frequency for data transactions between the processor 106 and the memories may vary with each memory.

Figure 2:
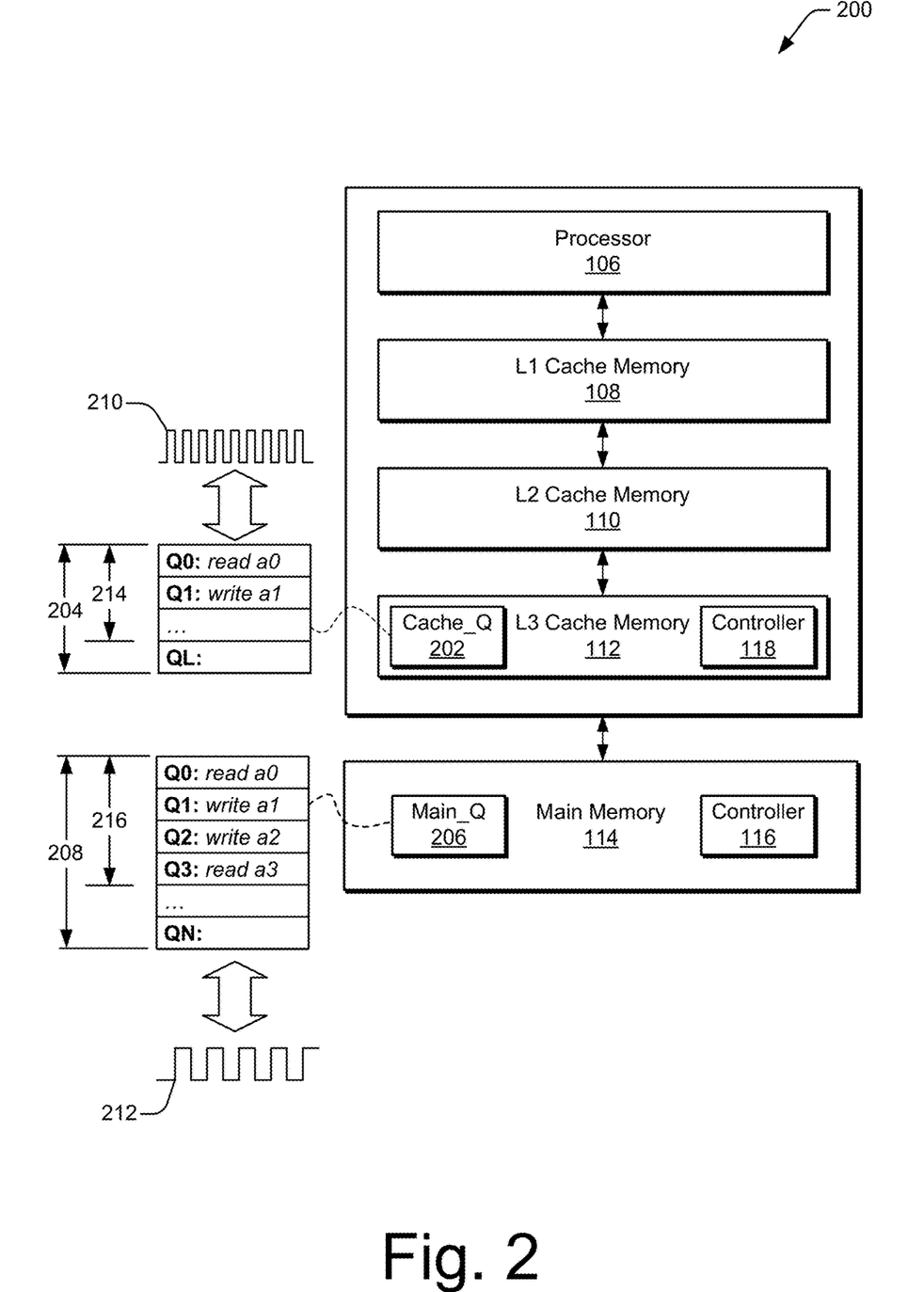
FIG. 2 illustrates example details of a cache memory transaction queue and a main memory transaction queue in accordance with one or more aspects.

FIG. 2 illustrates example details 200 of a cache memory transaction queue and a main memory transaction queue in accordance with one or more aspects. As shown in FIG. 2, the L3 cache memory 112 includes an L3 cache memory transaction queue 202 (e.g., Cache_Q) having a length 204 (e.g., a length corresponding to a quantity of "L+1" entries available in the L3 cache memory transaction queue 202). In some instances, the L3 cache memory transaction queue 202 may be an outgoing transaction queue, from which the processor 106 may read data.

The main memory 114 includes a main memory transaction queue 206 (e.g., Main_Q) having another length 208 (e.g., a length corresponding to a quantity of "N+1" available entries in the main memory transaction queue 206). In some instances, the main memory transaction queue 206 may be an incoming transaction queue, to which the processor 106 may write data.

Memory transactions between the processor 106 and the L3 cache memory 112 (e.g., memory reads and/or writes corresponding to entries in the L3 cache memory transaction queue 202) can be serviced at a rate that is responsive to, or corresponds to, an L3 cache memory clock frequency 210. Memory transactions between the processor 106 and the main memory 114 (e.g., memory reads and/or writes corresponding to entries in the main memory transaction queue 206) can be serviced at a rate that is responsive to, or corresponds to, a main memory clock frequency 212.

In general, and due to differences in lengths of transaction queues and/or differences in clock frequencies, a transaction between the processor 106 and respective memories may be completed at different rates. For example, if the length 204 is relatively shorter than the length 208, and if the L3 cache memory clock frequency 210 is relatively higher than the main memory clock frequency 212, the processor 106 may complete a memory transaction with the L3 cache memory 112 more quickly than it can complete a different transaction with the main memory 114.

In some instances, and as will be described in greater detail below, the L3 cache memory controller 118 and/or the main memory controller 116 may use heuristics to control the L3 cache memory clock frequency 210 and/or the main memory clock frequency 212. Such heuristics may use an occupied portion 214 of the length 204 of the L3 cache memory transaction queue 202 and/or an occupied portion 216 of the length 208 of the main memory transaction queue 206.

Figure 3:
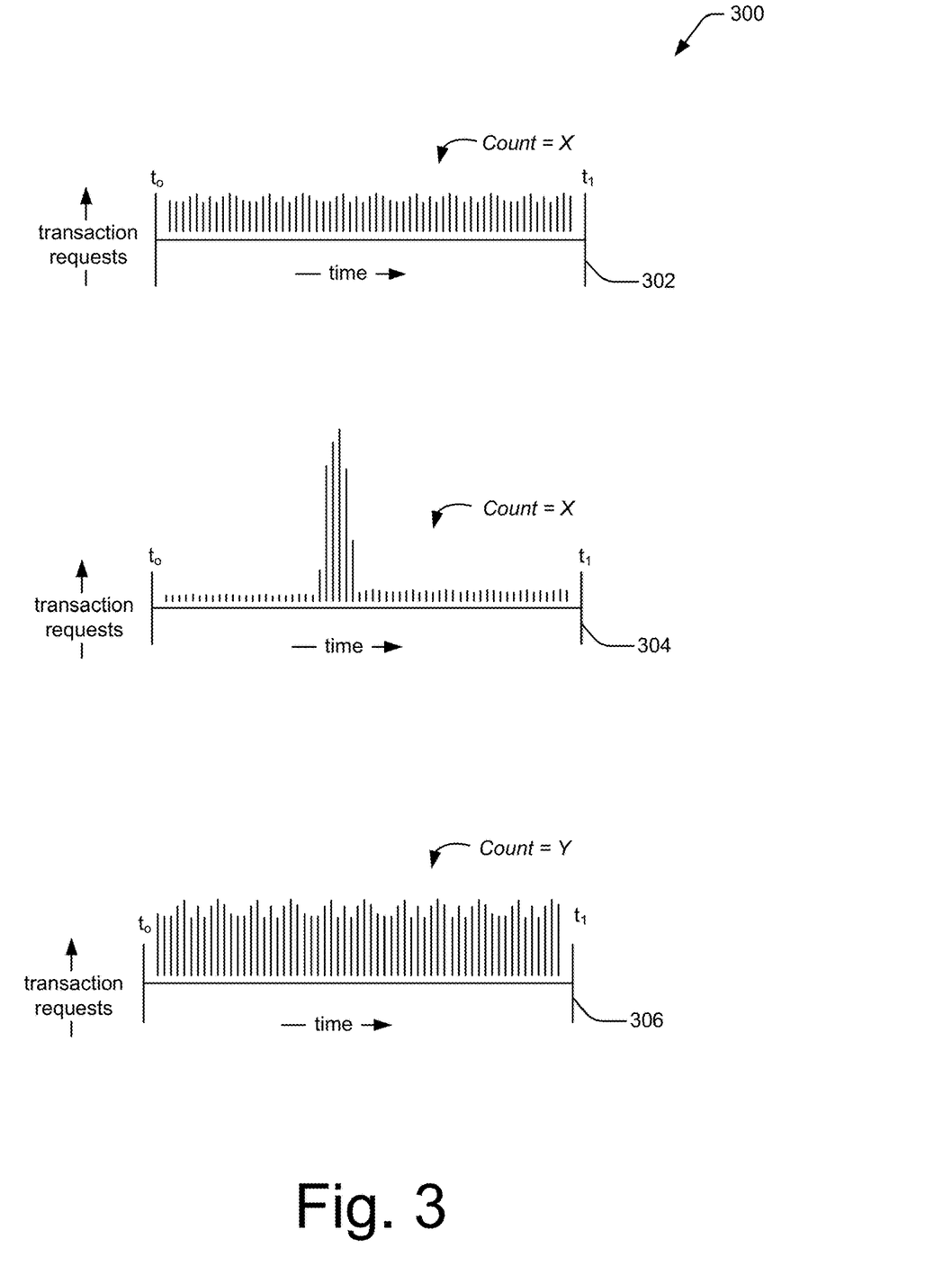
FIG. 3 illustrates example transaction request profiles in accordance with one or more aspects.

FIG. 3 illustrates example transaction request profiles 300 in accordance with one or more aspects. In some instances, the transaction request profiles 300 may be associated with the processor 106 of FIGS. 1 and 2 performing transactions with the main memory 114 of FIGS. 1 and 2 using aspects depicted in FIGS. 1 and 2.

The first example transaction request profile 302 illustrates an instance of a relatively low and uniform distribution of memory transaction requests across a predetermined duration of time. As illustrated, the transaction request profile 302 indicates that the processor 106 requests a quantity of "X" transactions with the main memory 114 over the predetermined duration of time that spans between to and ti (e.g., count=X).

Due to the even distribution, no memory transactions between the processor 106 and the main memory 114 are missed (e.g., the main memory clock frequency 212 is such that the main memory 114 can support memory transactions at a rate that is compatible with requests from the processor 106). Using heuristics founded on a count-based threshold (e.g., a count threshold of X), the main memory controller 116 would determine not to increase the main memory clock frequency 212 for the first example transaction request profile 302.

The second example transaction request profile 304 illustrates an instance of a non-uniform distribution of memory transaction requests across the same predetermined duration of time. Even though the processor 106 requests the same quantity of transactions with the main memory 114 over the same predetermined period of time (e.g., count=X), the transaction request profile 304 includes a "burst" during which a number of transaction requests is relatively high.

If the main memory clock frequency 212 is relatively low, the main memory 114 may "stall" (e.g., not be able to fulfill requested transactions with the processor 106) during the burst. Using heuristics founded on a count-based threshold (e.g., a count threshold of X), however, the main memory controller 116 would still determine not to increase the main memory clock frequency 212 for the second example transaction request profile 304.

In some instances, and to circumvent stalls that may occur during the burst condition, the heuristics in the main memory controller 116 may use a lower count threshold (e.g., count threshold<X). However, this may unnecessarily increase the main memory clock frequency 212 during steady-state conditions and therefore waste power.

The third example transaction request profile 306 illustrates an instance of a relatively high and uniform distribution of memory transaction requests across the same predetermined duration of time. As illustrated, the transaction request profile 306 indicates that the processor 106 requests a quantity of "Y" transactions with the main memory 114 over the predetermined duration of time that spans between to and ti (e.g., count=Y). Using heuristics founded on a count-based threshold (e.g., a count threshold of Y), the main memory controller 116 would determine to increase the main memory clock frequency 212. The increase in the main memory clock frequency 212, however, would not manifest until after the predetermined duration of time has transpired. Furthermore, the main memory 114 may stall before the predetermined duration of time expires.

In general, improved heuristics that use one or more thresholds based on memory transaction queue occupancy (e.g., an occupied portion of a length of the memory transaction queue) may alleviate drawbacks associated with heuristics that use count-based thresholds. The improved heuristics may proactively increase a clock frequency controlling access to a memory before the occurrence of instances where the memory may stall or may proactively reduce the clock frequency controlling the access to the memory ahead of instances where power may be wasted to further promote power efficiency.

Example Heuristic Details Using Transaction Queue Occupancy

Figure 4:
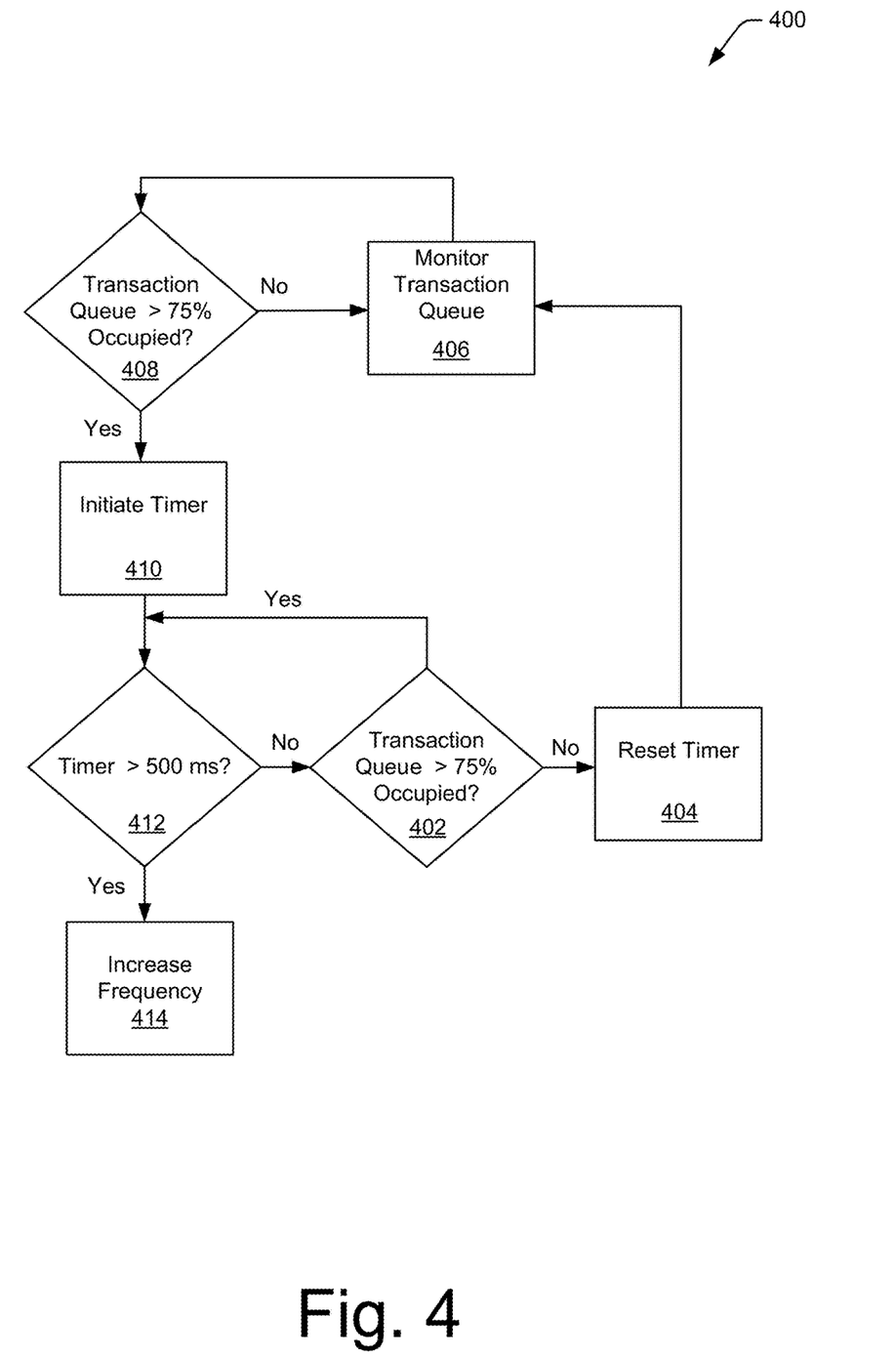
FIG. 4 illustrates a flowchart illustrating example heuristics for altering a clock frequency controlling access to a memory based on transaction queue occupancy in accordance with one or more aspects.

FIG. 4 illustrates a flowchart 400 illustrating example heuristics for altering a clock frequency controlling access to a memory using transaction queue occupancy in accordance with one or more aspects. For simplicity, the below description of the flowchart 400 will be in the context of the main memory controller 116 of FIGS. 1 and 2 controlling the main memory clock frequency 212 of the main memory 114. Nonetheless, the described principles are applicable to other memory types and/or levels, such as a cache memory that operates responsive to a cache memory clock frequency and a corresponding cache memory controller.

In some instances, the heuristics of the flowchart 400 may be initiated during a power-up condition of an electronic device (e.g., the electronic device 102 of FIG. 1). In other instances, heuristics of the flowchart 400 may be initiated in response to a command entered by a user of the electronic device 102 (e.g., the user may, through a selectable menu, change a mode or a setting of the electronic device to operate in a particular memory clock frequency mode using specific parameters or categories indicative of memory performance and/or power efficiency).

At decision 402, a determination of a state of a transaction queue is made relative to a transaction queue threshold. The transaction queue threshold may correspond to an occupied portion of a length of a transaction queue. Using the main memory transaction queue 206 and the main memory controller 116 as an example, the main memory controller 116 may compute the occupied portion 216 of the length 208. If the computation indicates that a transaction queue threshold is not violated (e.g., the occupied portion 216 of the length 208 is not greater than 75%), the main memory controller 116 may, at process 404, reset (e.g., zero-out) a timer. In some instances, the timer may be realized as circuitry that is included as part of the main memory controller 116 and that is capable of tracking a time duration using the main memory clock frequency 212.

The main memory controller 116 may, at operation 406, continue to monitor the main memory transaction queue 206. At decision 408, the main memory controller 116 may determine that the occupied portion 216 of the length 208 exceeds the transaction queue threshold (e.g., the occupied portion 216 is greater than 75% of the length 208). Upon determining that the transaction queue threshold is exceeded, the main memory controller 116 may, at operation 410, initiate the timer to monitor for a duration of time as indicated at decision 412.

The main memory controller 116 may, through iterative monitoring of the occupied portion 216 of the length 208 and comparison of the occupied portion 216 to the transaction queue threshold (at decision 402) over time, determine at decision 412 that the transaction queue threshold is violated for a duration of time (e.g., as illustrated, the transaction queue threshold of 75% is exceeded for more than 500 milliseconds (ms)). In response, the main memory controller 116 may at operation 414 increase the main memory clock frequency 212 to increase a rate at which the processor 106 can access the main memory 114 (e.g., by increasing a rate at which the main memory 114 processes memory transaction requests).

Although the heuristics of the flowchart 400 described above apply to a transaction queue threshold that provides an upper-threshold (e.g., a threshold that is violated if exceeded), variations of the heuristics may apply to a transaction queue threshold that provides a lower-threshold (e.g., one that is violated if a monitored value drops below the threshold). For instance, the main memory controller 116 may determine that the occupied portion 216 of the length 208 falls below another threshold of 50% for another time duration and, in response, decrease the main memory clock frequency 212 to decrease the rate of accessing of the main memory 114.

Heuristics illustrated by the flowchart 400 may also be modified to include simulations. The simulations can be used to "predict" if a lower frequency is sufficient for a current memory transaction rate. For example, using the main memory clock frequency 212, the main memory controller 116 may compute a quantity of clock cycles consumed to perform a memory transaction. The main memory controller 116 may determine that the simulated occupied portion 216 of the length 208 of the main memory transaction queue 206 will or would fall below a threshold based on the computed quantity of clock cycles. Responsive to this determination that is based on the simulation using a computed quantity of clock cycles at a given clock frequency, the main memory controller 116 may decrease the main memory clock frequency 212. Such simulations may, in some instances, use multiple iterations to decrease the main memory clock frequency 212 in stages using different thresholds.

In some instances, heuristics illustrated by the flowchart 400 may be performed by a combination of memory controllers. For example, the main memory controller 116 and the L3 cache memory controller 118 may be communicatively coupled, allowing operations and decisions of the flowchart 400 to be divided or shared between the main memory controller 116 and the L3 cache memory controller 118. The main memory controller 116 or the L3 cache memory controller 118 may, for instance, control the other's clock frequency through an exchange of messages, instructions, and so on.

In general, parameters that influence the heuristics of the flowchart 400 may be variable. For example, the transaction queue threshold, whether an upper-threshold or a lower-threshold, may be 50%, 60%, 70% and so on. As another example, the duration of time may be 100 ms, 500 ms, 1000 ms, and so on. In some instances, a user may vary or input such parameters into the electronic device 102 through a selectable menu, which may use qualitative terms (e.g., "memory power saving mode" or "memory high-performance mode") to represent different threshold values. In other instances, a manufacturer of the electronic device 102 may load the parameters into the electronic device 102. In yet other instances, the electronic device 102 may include power monitoring circuitry and logic that varies the parameters based on a charge-level (e.g., stored power) available to the electronic device.

Figure 5:
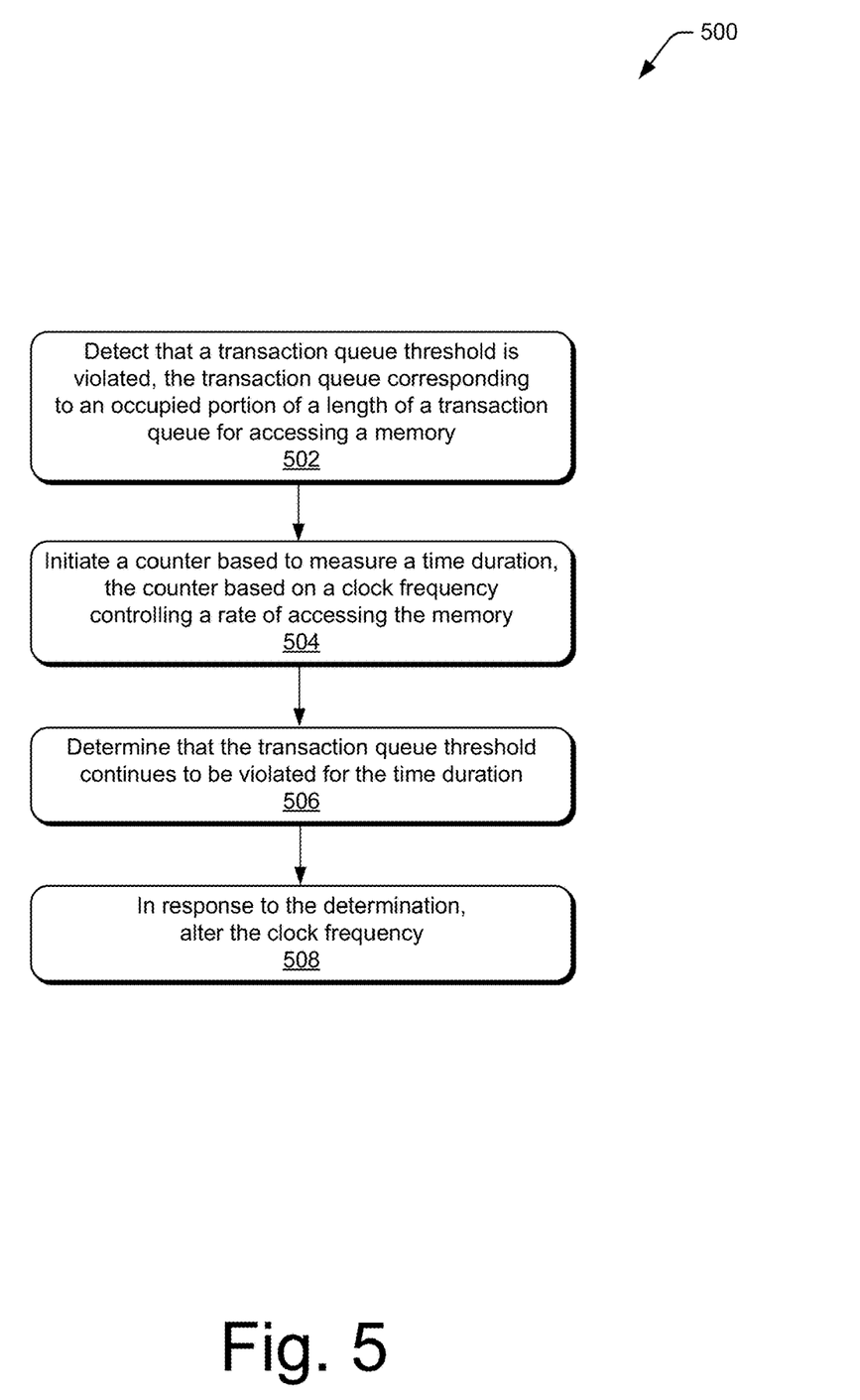
FIG. 5 illustrates an example method in accordance with one or more aspects.

FIG. 5 illustrates an example method 500 in accordance with one or more aspects. In some instances, the method 500 may be performed by a memory controller using elements of FIGS. 1, 2, and 4.

At operation 502, the memory controller (e.g., the main memory controller 116) may detect that a transaction queue threshold is violated. The transaction queue threshold may correspond to the occupied portion 216 of the length 208 of the main memory transaction queue 206. In some instances, the violation may correspond to exceeding an upper-threshold, while in other instances the violation may correspond to falling below a lower-threshold.

At operation 504, and in response to determining that the transaction queue threshold is violated, the memory controller may initiate a counter based on a clock frequency to measure a time duration (e.g., for a given or known clock frequency, a counter may count a number of cycles and, from the counted number of cycles, compute a corresponding time duration). The clock frequency may correspond to the main memory clock frequency 212 that controls a rate at which the main memory 114 can process memory requests issued by the processor 106.

At operation 506, the memory controller may determine that the transaction queue threshold continues to be violated for the time duration. At 508, and in response to the determination that the transaction queue threshold continues to be violated for the time duration, the memory controller may alter the clock frequency.

In an instance where the transaction queue threshold is an upper-threshold and violating the transaction queue threshold for the time duration includes exceeding the transaction queue threshold for the time duration, altering the clock frequency may include increasing the clock frequency to increase the rate at which the processor can access the memory. In an instance where the transaction queue threshold is a lower-threshold and violating the transaction queue threshold for the time duration includes being below the transaction queue threshold for the time duration, altering the clock frequency may include decreasing the clock frequency to decrease the rate of operation of the memory to reduce power use.

Although the method 500 is described in the context of the main memory controller 116 altering the main memory clock frequency 212, the method 500 includes many variations. For instance, the method 500 may be performed by another memory controller, such as the L3 cache memory controller 118. In such an instance, the transaction queue threshold may correspond to the occupied portion 214 of the length 204 of the L3 cache memory transaction queue 202, the clock frequency may correspond to L3 cache memory clock frequency 210, and the memory may correspond to the L3 cache memory 112. The method 500 may also encompass other memories (e.g., the L1 cache memory 108, the L2 cache memory 110, and so on). Furthermore, and in some instances, portions of the method 500 may be performed by the processor 106.

Figure 6:
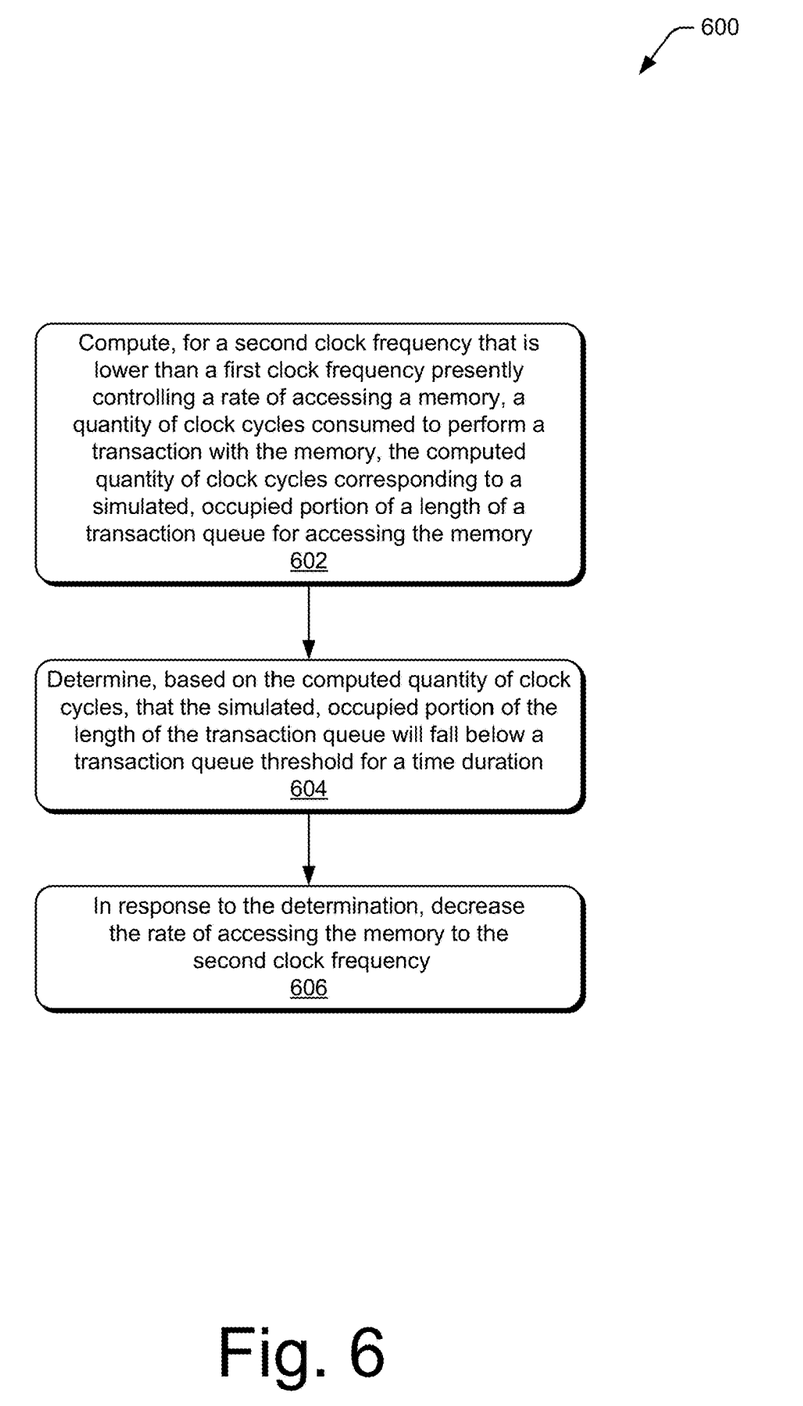
FIG. 6 illustrates another example method in accordance with one or more aspects.

FIG. 6 illustrates another example method 600 in accordance with one or more aspects. In some instances, the method 600 may be performed by a memory controller using elements of FIGS. 1, 2, and 4.

At operation 602, the memory controller (e.g., the main memory controller 116) may compute, for a second clock frequency that is lower than a first clock frequency presently controlling a rate of accessing a memory (e.g., the main memory 114), a quantity of clock cycles that transpire to perform a memory transaction (e.g., a read or a write entry from the main memory transaction queue 206). The computed quantity of clock cycles per memory transaction may be used to simulate a changing size of an occupied portion of a length of a transaction queue for accessing the memory (e.g., simulate how the occupied portion 216 of the length 208 of the main memory transaction queue 206 would change over time if the main memory 114 were processing memory transactions at the slower second clock frequency).

At operation 604, the memory controller may determine that the simulated occupied portion of the length (e.g., the portion 216 of the length 208 as simulated) falls below a transaction queue threshold for a time duration. At operation 606, the memory controller may then decrease the rate of accessing the memory from the first clock frequency to the second clock frequency.

In some instances, determining that the simulated occupied portion of the length falls below the transaction queue threshold may include subtracting an offset (e.g., an offset that functions as a guard-band or a bias) from the transaction queue threshold. Also, in some instances, the memory controller may identify a value for the second clock frequency through iterative computations using multiple other clock frequencies that are lower than the first clock frequency. In such instances, and before identifying the second clock frequency, the memory controller may determine that multiple, other clock frequencies have simulated portions of the length of the transaction queue that are greater than or equal to the transaction queue threshold for the time duration.

Although the method 600 is described in the context of the main memory controller 116 altering the main memory clock frequency 212, the method 600 includes many variations. For instance, the method 600 may be performed by another memory controller, such as the L3 cache memory controller 118. In such an instance, the transaction queue threshold may correspond to the occupied portion 214 of the length 204 of the L3 cache memory transaction queue 202 (e.g., the portion 214 as simulated), the clock frequency may correspond to the L3 cache memory clock frequency 210, and the memory may correspond to the L3 cache memory 112. The method 600 may also encompass other memories (e.g., the L1 cache memory 108, the L2 cache memory 110, and so on). Furthermore, and in some instances, portions of the method 600 may be performed by the processor 106.

Figure 7:
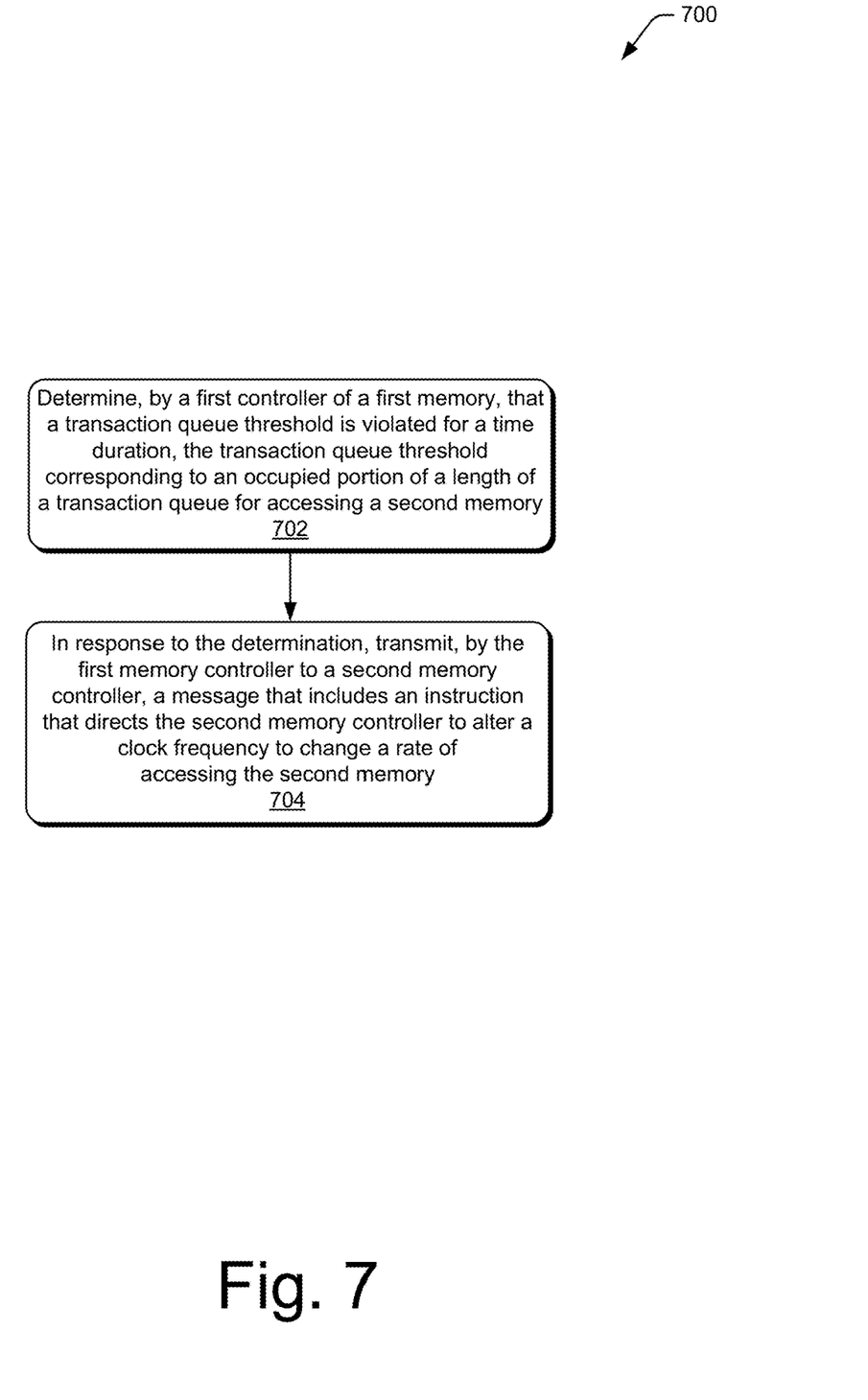
FIG. 7 illustrates another example method in accordance with one or more aspects.

FIG. 7 illustrates another example method 700 in accordance with one or more aspects. In some instances, the method 700 may be performed by memory controllers of an electronic device, such as the main memory controller 116 and the L3 cache memory controller 118 of the electronic device 102 of FIG. 1, using elements of FIGS. 1, 2, and 4.

At operation 702, a first memory controller (e.g., the main memory controller 116) may determine that a transaction queue threshold is violated for a time duration. In such an instance, the transaction queue threshold may correspond to an occupied portion of a length of a memory transaction queue (e.g., the occupied portion 214 of the length 204 of the L3 cache memory transaction queue 202).

In response, at operation 704, the first memory controller may transmit a message to a second memory controller (e.g., the L3 cache memory controller 118). The message may include an instruction that directs (e.g., causes) the second memory controller to alter a clock frequency to change a rate of accessing a second memory (e.g., the L3 cache memory 112).

Although described in the context of operations between the main memory controller 116 and the L3 cache memory controller 118, the method 700 includes many variations. As a first example variation, the method 700 may include operations performed by the L3 cache memory controller 118 and another cache memory controller (e.g., a controller of the L1 cache memory 108 or the L2 cache memory 110). As a second example variation, the L3 cache memory controller 118 may use input from the main memory controller 116 as an additional input for controlling a rate of accessing the L3 cache memory 112 (e.g., whether the L3 cache memory controller 118 controls the L3 cache memory clock frequency 210 based on the occupied portion 214 of the length 204 of the L3 cache memory transaction queue 202 or whether the L3 cache memory controller 118 controls the L3 cache memory clock frequency 210 using another technique). As a third example variation, portions of the method 700 may be performed by the processor 106.

The preceding discussion describes methods relating to using transaction queue occupancy to alter a clock frequency that controls access to a memory of an electronic device. Aspects of these methods may be implemented in hardware (e.g., fixed logic circuitry), firmware, software, or any combination thereof. As an example, one or more operations described in methods 500, 600, or 700 may be performed by a computing system having one or more processors and a computer-readable medium (CRM). In such an instance, the CRM may encompass fixed or hard-coded circuitry, finite-state machines, programmed logic, and so forth that perform the one or more operations.

Furthermore, these techniques may be realized using one or more of the entities or components shown in FIGS. 1, 2, and 4, which may be further divided, combined, and so on. Thus, these figures illustrate some of the many possible systems or apparatuses capable of employing the described techniques. The entities and components of these figures generally represent software, firmware, hardware, whole or portions of devices or networks, or a combination thereof.

ADDITIONAL EXAMPLES

Example 1: A method performed by a memory controller, the method comprising: detecting that a transaction queue threshold is violated, the transaction queue threshold corresponding to an occupied portion of a length of a transaction queue for accessing a memory; in response to the detecting, initiating a counter to measure a time duration, the counter based on a clock frequency controlling a rate of accessing the memory; determining that the transaction queue threshold continues to be violated for the time duration; and in response to the determining, altering the clock frequency.

Example 2: The method as recited by example 1, wherein: the transaction queue threshold is an upper-threshold; violating the transaction queue threshold for the time duration includes exceeding the transaction queue threshold for the time duration; and altering the clock frequency increases the clock frequency to increase the rate of accessing the memory.

Example 3: The method as recited by example 1, wherein: the transaction queue threshold comprises a lower-threshold; violating the transaction queue threshold for the time duration includes falling below the transaction queue threshold for the time duration; and altering the clock frequency decreases the clock frequency to decrease the rate of accessing the memory.

Example 4: The method as recited by any of examples 1 to 3, wherein the memory includes a main memory that comprises a dynamic random-access memory.

Example 5: The method as recited by any of examples 1 to 3, wherein the memory includes a cache memory that comprises a static random-access memory.

Example 6: The method as recited by any of examples 1 to 5, wherein the memory shares a system-on-chip integrated circuit die with a processor.

Example 7: A method performed by a memory controller, the method comprising: computing, for a second clock frequency that is lower than a first clock frequency presently controlling a rate of accessing a memory, a quantity of clock cycles consumed to perform a transaction with the memory, the computed quantity of clock cycles consumed to perform the transaction with the memory corresponding to a simulated, occupied portion of a length of a transaction queue for accessing the memory; determining, based on the computed quantity of clock cycles, that the simulated, occupied portion of the length of the transaction queue will fall below a transaction queue threshold for a time duration; and in response to the determining, decreasing the rate of accessing the memory to the second clock frequency.

Example 8: The method as recited by example 7, wherein determining that the simulated, occupied portion of the length of the transaction queue will fall below the transaction queue threshold for the time duration includes subtracting an offset from the transaction queue threshold.

Example 9: The method as recited by example 7, wherein determining includes the memory controller determining the second clock frequency through iterative computations using multiple other clock frequencies that are lower than the first clock frequency, the multiple, other clock frequencies determined to have simulated, occupied portions of the length of the transaction queue that are greater than or equal to the transaction queue threshold for the time duration.

Example 10: The method as recited by any of examples 7 to 9, wherein the memory includes a main memory that comprises a dynamic random-access memory.

Example 11: The method as recited by any of examples 7 to 9, wherein the memory includes a cache memory that comprises a static random-access memory.

Example 12: The method as recited by any of examples 7 to 9, wherein the memory shares a system-on-chip integrated circuit die with a processor.

Example 13: A method performed by an electronic device, the method comprising: determining, by a first memory controller of a first memory of the electronic device, that a transaction queue threshold is violated for a time duration, the transaction queue threshold corresponding to an occupied portion of a length of a transaction queue for accessing a second memory of the electronic device; and, in response to the determining, transmitting, by the first memory controller to a second memory controller of the electronic device, a message, the message including an instruction that directs the second memory controller to alter a clock frequency to change a rate of accessing the second memory.

Example 14: The method as recited by example 13, wherein the transaction queue threshold or the time duration comprises a variable that is input by a user of the electronic device.

Example 15: The method as recited by example 13 or example 14, wherein the transaction queue is an outgoing transaction queue.

Example 16: The method as recited by any of examples 13 to 15, wherein the first memory includes a cache memory, and the second memory includes a main memory.

Example 17: The method as recited by any of examples 13 to 15, wherein the first memory includes a cache memory and the second memory includes another cache memory.

Example 18: The method as recited by any of examples 13 to 17, wherein the first memory and the second memory share a system-on-chip integrated circuit die with a processor.

Example 19: The method as recited by any of examples 13 to 18, wherein: the transaction queue threshold is an upper-threshold; violating the transaction queue threshold for the time duration includes exceeding the transaction queue threshold for the time duration; and altering the clock frequency increases the clock frequency to increase the rate of accessing the second memory.

Example 20: The method as recited by any of examples 13 to 18, wherein: the transaction queue threshold is a lower-threshold; violating the transaction queue threshold for the time duration includes falling below the transaction queue threshold for the time duration; and altering the clock frequency decreases the clock frequency to decrease the rate of accessing the second memory.

Example 21: A computer-readable storage medium comprising computer executable instructions that when executed by a computer will cause the computer to carry out a method according to any one of the preceding examples.

Example 22: A computer system comprising: one or more processors; and a computer-readable storage medium according to example 21.

Although implementations and apparatuses are described that use transaction queue occupancy to alter clock frequencies controlling access to a memory of an electronic device, the subject of the appended claims is not necessarily limited to the specific features or methods described. Rather, the specific features and methods are disclosed as example implementations for using transaction queue occupancy to alter clock frequencies controlling access to a memory of an electronic device

What is claimed is:

1. A method performed by a memory controller, the method comprising:
    detecting that a transaction queue threshold is violated, the transaction queue threshold corresponding to an occupied portion of a length of a transaction queue for accessing a memory;
    in response to detecting that the transaction queue threshold is violated, initiating a counter to measure a time duration, the counter based on a clock frequency controlling a rate of accessing the memory;
    determining that the transaction queue threshold continues to be violated for the time duration; and
    in response to determining that the transaction queue threshold continues to be violated for the time duration, altering the clock frequency controlling the rate of accessing the memory.

2. The method as recited by claim 1, wherein:
    the transaction queue threshold comprises an upper-threshold;
    violating the transaction queue threshold for the time duration includes exceeding the transaction queue threshold for the time duration; and
    altering the clock frequency increases the clock frequency to increase the rate of accessing the memory.

3. The method as recited by claim 1, wherein:
    the transaction queue threshold comprises a lower-threshold;
    violating the transaction queue threshold for the time duration includes being below the transaction queue threshold for the time duration; and
    altering the clock frequency decreases the clock frequency to decrease the rate of accessing the memory.

4. The method as recited by claim 1, wherein the memory includes a main memory that comprises a dynamic random-access memory.

5. The method as recited by claim 1, wherein the memory includes a cache memory that comprises a static random-access memory.

6. The method as recited by claim 1, wherein the memory shares a system-on-chip integrated circuit die with a processor.

7. A method performed by an electronic device, the method comprising:
    determining, by a first memory controller of a first memory of the electronic device, that a transaction queue threshold is violated for a time duration, the transaction queue threshold corresponding to an occupied portion of a length of a transaction queue for accessing a second memory of the electronic device; and
    in response to the determining, transmitting, by the first memory controller to a second memory controller of the electronic device, a message, the message including an instruction that directs the second memory controller to alter a clock frequency to change a rate of accessing the second memory.

8. The method as recited by claim 7, wherein the transaction queue threshold or the time duration comprises a variable that is input by a user of the electronic device.

9. The method as recited by claim 7, wherein the time duration comprises a variable that is input by a user of the electronic device.

10. The method as recited by claim 7, wherein the transaction queue is an outgoing transaction queue.

11. The method as recited by claim 7, wherein the first memory includes a cache memory, and the second memory includes another cache memory.

12. The method as recited by claim 7, wherein the first memory and the second memory share a system-on-chip integrated circuit die with a processor.

13. The method as recited by claim 7, wherein:
    the first memory comprises a first cache memory; or
    the second memory comprises a second cache memory.

14. A computing system comprising:
    a memory with a transaction queue configured to store requests for accessing the memory;
    a clock configured to generate a clock signal having a clock frequency that controls a rate of accessing the memory;
    a counter; and
    a memory controller configured to:
        detect that a transaction queue threshold is violated, the transaction queue threshold corresponding to an occupied portion of a length of the transaction queue for accessing the memory;
        in response to detecting that the transaction queue threshold is violated, initiating the counter to measure a time duration, the counter based on the clock frequency that controls the rate of accessing the memory;
        determine that the transaction queue threshold continues to be violated for the time duration; and
        in response to determining that the transaction queue threshold continues to be violated for the time duration, alter the clock frequency controlling the rate of accessing the memory.

15. The computing system as recited by claim 14, wherein:

the transaction queue threshold comprises an upper-threshold;

violating the transaction queue threshold for the time duration includes exceeding the transaction queue threshold for the time duration; and altering the clock frequency increases the clock frequency to increase the rate of accessing the memory.

16. The computing system as recited by claim 14, wherein:

the transaction queue threshold comprises a lower-threshold;

violating the transaction queue threshold for the time duration includes being below the transaction queue threshold for the time duration; and altering the clock frequency decreases the clock frequency to decrease the rate of accessing the memory.

17. The computing system as recited by claim 14, wherein the memory includes a main memory that comprises a dynamic random-access memory.

18. The computing system as recited by claim 14, wherein the memory includes a cache memory that comprises a static random-access memory.

19. The computing system as recited by claim 14, further comprising a processor and wherein the memory is embodied as a system-on-chip integrated circuit die that comprises the processor of the computing system.

* * * * *